United States Patent
Mizutani

(10) Patent No.: US 9,023,751 B2
(45) Date of Patent: May 5, 2015

(54) METHOD FOR PRODUCING CATALYST

(75) Inventor: Nobuaki Mizutani, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 190 days.

(21) Appl. No.: 13/640,100

(22) PCT Filed: Apr. 20, 2010

(86) PCT No.: PCT/JP2010/056975
§ 371 (c)(1),
(2), (4) Date: Oct. 9, 2012

(87) PCT Pub. No.: WO2011/132258
PCT Pub. Date: Oct. 27, 2011

(65) Prior Publication Data
US 2013/0035226 A1  Feb. 7, 2013

(51) Int. Cl.
*H01M 4/90* (2006.01)
*H01M 4/92* (2006.01)
*B01J 37/16* (2006.01)
*B01J 23/52* (2006.01)
*B01J 35/00* (2006.01)

(52) U.S. Cl.
CPC ............. *H01M 4/921* (2013.01); *H01M 4/925* (2013.01); *Y02E 60/50* (2013.01); *B01J 37/16* (2013.01); *B01J 23/52* (2013.01); *B01J 35/0033* (2013.01); *B01J 35/0046* (2013.01); *H01M 4/926* (2013.01)

(58) Field of Classification Search
None
See application file for complete search history.

(56) References Cited

U.S. PATENT DOCUMENTS

| | | | |
|---|---|---|---|
| 6,147,027 A | 11/2000 | Miyake et al. | |
| 2004/0115515 A1 | 6/2004 | Ueda et al. | |
| 2007/0026292 A1* | 2/2007 | Adzic et al. | 429/44 |
| 2008/0280184 A1* | 11/2008 | Sakai et al. | 429/34 |
| 2010/0216049 A1 | 8/2010 | Hibino et al. | |
| 2011/0129763 A1* | 6/2011 | Lee et al. | 429/532 |

FOREIGN PATENT DOCUMENTS

| | | |
|---|---|---|
| EP | 2 133 944 A1 | 12/2009 |
| JP | 10-163333 | 6/1998 |
| JP | 11-156193 | 6/1999 |
| JP | 2004-146223 | 5/2004 |
| JP | 2008-270180 | 11/2008 |
| JP | 2008-270181 | 11/2008 |
| JP | 2009-510705 | 3/2009 |
| JP | 2009-70733 | 4/2009 |
| JP | 2009-263719 | 11/2009 |
| WO | WO 2008/033113 A2 | 3/2008 |

* cited by examiner

*Primary Examiner* — Melvin C Mayes
*Assistant Examiner* — Colette Nguyen
(74) *Attorney, Agent, or Firm* — Finnegan, Henderson, Farabow, Garrett & Dunner, LLP

(57) ABSTRACT

This invention is intended to improve the coverage of a platinum or platinum alloy surface with gold when producing a catalyst comprising carrier particles that support gold-modified platinum or platinum alloys. The invention provides a method for producing a catalyst comprising carrier particles that support gold-modified platinum or platinum alloys comprising a step of gold reduction comprising adding carrier particles that support platinum or platinum alloys, a reducing agent, and a gold precursor to a liquid medium and mixing the same, wherein the reducing agent is added to adjust the ORP value (i.e., an oxidation-reduction potential with reference to the silver-silver chloride electrode) of the liquid medium to −630 to +230 mV upon completion of addition.

7 Claims, 7 Drawing Sheets

METHOD FOR PRODUCING CATALYST

CROSS-REFERENCE TO RELATED APPLICATIONS

This application is a national phase application of International Application No. PCT/JP2010/056975, filed Apr. 20, 2010, the content of which is incorporated herein by reference.

TECHNICAL FIELD

The present invention provides a method for producing a carrier particle that supports gold-modified platinum or a platinum alloy and is useful as a catalyst.

BACKGROUND ART

Conductive carrier particles that support fine particles of platinum or platinum alloys are useful as electrode catalysts that catalyze hydrogen oxidation reactions at the hydrogen electrode and oxygen reduction reactions at the oxygen electrode of a fuel cell. Accordingly, research of such carrier particles aimed at practical application thereof has been actively conducted.

However, several technical difficulties arise with the use of platinum fine particles for electrode catalysts. For example, platinum fine particles are dissolved due to electric potential changes, and activity thereof is lowered due to adsorption of carbon monoxide at the particle surfaces. Thus, the durability of electrode catalysts using platinum fine particles is not always satisfactory.

In order to overcome such drawback, development of techniques for improving the durability of platinum fine particles as catalysts via surface modification with gold has heretofore been conducted.

Patent Documents 1 and 2 each disclose a technique for modifying a platinum-supporting carbon catalyst via gold deposition so as to enhance the power generation efficiency of a platinum-supporting carbon catalyst. Specifically, Patent Documents 1 and 2 each disclose a method of adding a reducing agent ($NaBH_4$) dropwise to a mixed solution of a platinum-supporting carbon catalyst and a gold salt to reduce and deposit gold and thus to cover platinum with gold.

Patent Document 3 discloses a method for producing an exhaust gas purging catalyst comprising adding a reducing agent ($Na_2S_2O_3$) dropwise to a mixed solution of a metal oxide that supports platinum particles and a gold salt at a solution temperature of 60° C. to cover the platinum particle surface with gold.

Patent Document 4 discloses a technique for covering and protecting at least part of the surfaces of platinum fine particles supported on conductive carrier particles with a thin gold film. The method for forming a thin gold film disclosed by Patent Document 4 is as follows. At the outset, conductive carrier particles that support platinum fine particles are placed on the electrode, the resultant is soaked in an aqueous solution of roughly 50 mM $CuSO_4$/0.10M $H_2SO_4$, and an adequate reduction potential is appled to the electrode to form a monatomic copper layer on the platinum fine particle surfaces. This process is referred to as "underpotential deposition (UPD)." In the UPD process, a potential slightly more positive than a copper reduction potential (i.e., 0.337 V at pH 2 or less comparison with a standard hydrogen electrode)) is applied to deposit a monatomic copper layer on the platinum fine particle surface. Subsequently, the electrode is soaked in a solution of a gold salt, and a copper monatomic layer having a reduction potential lower than that of gold is displaced with a gold monatomic layer via spontaneous redox displacement. Thus, at least part of the platinum fine particle surface is covered with a gold monatomic layer.

PRIOR ART DOCUMENTS

Patent Documents

Patent Document 1: JP Patent Publication (kokai) No. 2008-270180 A
Patent Document 2: JP Patent Publication (kokai) No. 2008-270182 A
Patent Document 3: JP Patent Publication (kokai) No. H11-156193 A (1999)
Patent Document 4: JP Patent Publication (kohyo) No. 2009-510705 A

DISCLOSURE OF THE INVENTION

Object of the Invention

It is preferable that a platinum fine particle surface be thoroughly covered with gold in order to improve the durability of a catalyst composed of platinum fine particles. The present inventors found that, when gold is deposited from a gold precursor by the action of a reducing agent to modify a platinum-supporting catalyst, a platinum fine particle surface is not thoroughly covered with gold and gold is disadvantageously deposited in a region on the carrier surface where platinum fine particles are absent or in a solution, depending on the speed at which a reducing agent is added, temperature, or other conditions.

Neither Patent Documents 1, 2 or 3 disclose the conditions, such as the speed at which a reducing agent is added or temperature necessary for increasing the area of the platinum fine particle surface covered with gold.

The method of Patent Document 4 requires precise control of potentials in order to electrically conduct underpotential deposition of copper. When such method is implemented on a large scale, disadvantageously, the cost is high, uniform potential control is difficult, and unevenness is likely to occur in the final amount of modification with gold. Thus, a chemical method of gold deposition using a reducing agent is suitable for large-scale deposition.

Accordingly, it is an object of the present invention to provide an effective means for improving the coverage of a platinum or platinum alloy surface with gold in the production of a catalyst comprising carrier particles that support gold-modified platinum or platinum alloys by depositing gold from a gold precursor by the action of a reducing agent.

Means for Attaining the Object

The present inventors found that the coverage of a platinum or platinum alloy surface with gold is significantly improved when, in a gold reduction process comprising adding carrier particles that support platinum or platinum alloys, a reducing agent, and a gold precursor to a liquid medium and mixing the same, the reducing agent is added to adjust the ORP value (i.e., an oxidation-reduction potential with reference to the silver-silver chloride electrode) of the liquid medium to −630 to +230 mV upon completion of addition. The present invention includes the following.

(1) A method for producing a catalyst comprising carrier particles that support gold-modified platinum or platinum alloys comprising a step of gold reduction comprising adding carrier particles that support platinum or platinum alloys, a reducing agent, and a gold precursor to a liquid medium and mixing the same, wherein the step of gold reduction comprises adding the reducing agent to adjust the ORP value (i.e., an oxidation-reduction potential with reference to the silver-silver chloride electrode) of the liquid medium to −630 to +230 mV upon completion of addition.

(2) The method according to (1), wherein the step of gold reduction comprises a first step of adding the carrier particles that support platinum or platinum alloys and the gold precursor to the liquid medium and mixing the same and a second step of adding the reducing agent to the mixture obtained in the first step.

(3) The method according to (1) or (2), wherein the reducing agent is a branched-chain alcohol.

(4) The method according to (3), wherein the branched-chain alcohol is isopropyl alcohol.

(5) The method according to (1) or (2), wherein the reducing agent is ethanol and, in the step of gold reduction, the speed at which ethanol is added to the liquid medium is 6 to 60 mol/Au mol/min, and the temperature of the liquid medium is between 60° C. and 90° C.

(6) The method according to (1) or (2), wherein the reducing agent is hydrazine and, in the step of gold reduction, the speed at which hydrazine is added to the liquid medium is 0.1 to 1 mol/Au mol/min, and the temperature of the liquid medium is between 2° C. to 5° C.

(7) The method according to any of (1) to (6), wherein the catalyst is an electrode catalyst for a fuel cell.

Effects of the Invention

The method of the present invention can improve the coverage of a platinum or platinum alloy surface with gold of a catalyst comprising carrier particles that support gold-modified platinum or platinum alloys.

EMBODIMENTS OF THE INVENTION

Figure 1:
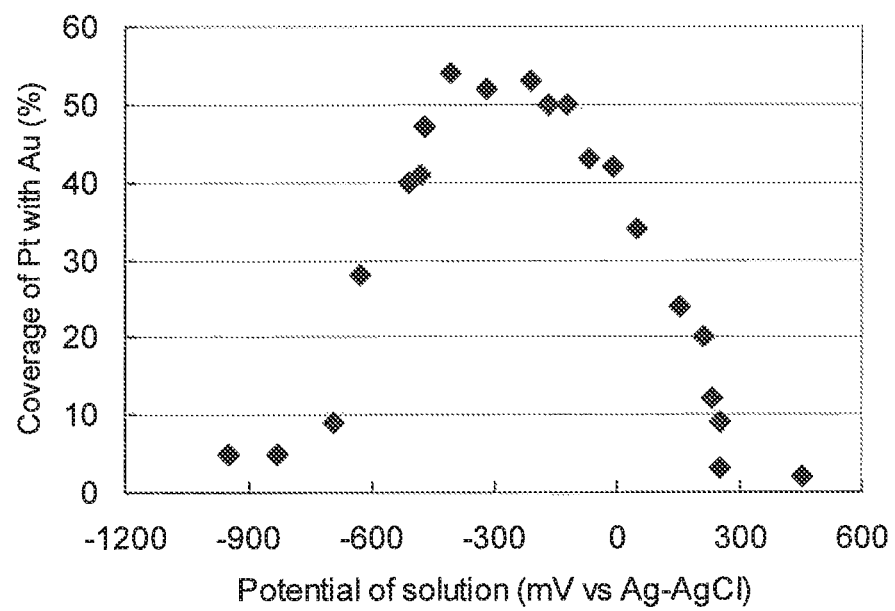
FIG. 1 shows the correlation between an ORP value and the coverage of a Pt surface with Au.

The present invention involves the use of a carrier particle that supports platinum or a platinum alloy as a starting material.

A platinum alloy is not particularly limited, provided that it can be used as an electrode catalyst for a fuel cell. Examples thereof include alloys of at least one metal selected from among ruthenium, iron, nickel, manganese, cobalt, and copper with platinum.

Carrier particles are not particularly limited, provided that such particles are capable of supporting fine particles of platinum or platinum alloys. Conductive carrier particles that can be used as carrier materials for catalysts of fuel cells are preferable, and particles of conductive carbon materials are particularly preferable. Examples of particles of conductive carbon materials include porous carbon particles, such as carbon black and activated carbon, and carbon fibers. Carbon black products are particularly preferable as carrier particles. Specific examples of commercially available carbon black products that can be used include Ketjen EC® (Ketjen Black International), Ketjen 600JD® (Ketjen Black International), Black Pearls® (Cabot), Vulcan 10H (Cabot), Vulcan 9 (Cabot), Vulcan 7H (Cabot), Vulcan 6 (Cabot), Vulcan 6LM (Cabot), and Denka Black (Denki Kagaku Kogyo Kabushiki Kaisha).

Carrier particles that support platinum or platinum alloys may be produced by any technique. Diameters of platinum or platinum alloy particles on the carrier particles are typically between 1 nm and 10 nm (measurement method: TEM images (100-point-average)).

According to the method of the present invention, the term "step of gold reduction" refers to a step of adding carrier particles that support platinum or platinum alloys, a reducing agent, and a gold precursor to a liquid medium and mixing the same to reduce and deposit gold on the surfaces of fine particles of platinum or platinum alloys. Surprisingly, the present inventors found that the coverage of the surfaces of fine particles of platinum or platinum alloys with gold would be improved when adding a reducing agent to adjust the ORP value (i.e., an oxidation-reduction potential with reference to the silver-silver chloride electrode) of the liquid medium to −630 to +230 mV upon completion of addition in the step of gold reduction. Adjustment of the ORP value to such range is considered to cause reduction and deposition of gold from a gold precursor selectively on the surfaces of fine particles of platinum or platinum alloys and cover the surfaces of fine particles of platinum or platinum alloys with gold. When the ORP value is more negative than −630 mV, however, gold reduction proceeds rapidly. This is considered to cause non-selective gold deposition at regions other than the surfaces of fine particles of platinum or platinum alloys and reduce the coverage of the surfaces of fine particles of platinum or platinum alloys with gold. When the ORP value is more positive than +230 mV, the speed of gold reduction is lowered, and gold particles become coarse. This is considered to reduce the coverage of the surfaces of fine particles of platinum or platinum alloys with gold.

The term "ORP value" used herein refers to the oxidation-reduction potential of a liquid medium with reference to a silver-silver chloride electrode. A reference silver-silver chloride electrode is soaked in a liquid medium when measuring the ORP value, and it is retained under an environment identical to that of the liquid medium to be measured. The ORP value can be measured by soaking the electrode (i.e., a composite electrode comprising a platinum electrode and a control electrode) in a liquid medium with the use of an ORP meter (HM30G, TOA DDK).

The ORP value above was obtained when the addition of a reducing agent to a liquid medium was completed. The ORP value of a liquid medium upon completion of the addition of the reducing agent is more preferably between −600 mV and +200 mV, and particularly preferably between −500 mV and +100 mV.

A liquid medium is not particularly limited, and water is preferable.

A reducing agent is not particularly limited, provided that the ORP value of the liquid medium is within the above range upon completion of the addition. Preferable examples of reducing agents include a branched-chain alcohol, trisodium citrate, ethanol, hydrazine, propanol, and ethylene glycol. Examples of branched-chain alcohols include isopropyl alcohol, 2-butanol, and 2-methyl-2-propanol.

The amount of the reducing agent added is not particularly limited, and such amount is preferably 1 to 10 times greater than that of Au in terms of mole equivalent. The optimal value can be adequately determined in accordance with the reduction power of a relevant reducing agent.

When a branched-chain alcohol such as isopropyl alcohol is used as a reducing agent, the speed at which a reducing agent is introduced and the temperature of a liquid medium (i.e., reduction temperature) are not particularly limited. A branched-chain alcohol is added typically at a speed of 1 mol/Au mol/min or higher, the upper limit is not particularly limited, and it is generally 100 mol/Au mol/min or lower, and preferably 60 mol/Au mol/min or lower. In such case, the temperature of the liquid medium can be set between 40° C. and 90° C.

When trisodium citrate is used as a reducing agent, the speed at which a reducing agent is added and the temperature of a liquid medium (i.e., reduction temperature) are not particularly limited. Trisodium citrate is added typically at a speed of 1 mol/Au mol/min or higher, the upper limit is not particularly limited, and it is generally 100 mol/Au mol/min or lower, and preferably 60 mol/Au mol/min or lower. In such case, the temperature of the liquid medium can be set between 40° C. and 90° C.

When ethanol is used as a reducing agent, the speed at which a reducing agent is added is preferably between 6 and 100 mol/Au mol/min, and more preferably between 6 and 60 mol/Au mol/min, and the temperature of the liquid medium is preferably between 60° C. and 90° C. When the speed of addition is designated as y (mol/Au mol/min) and the temperature of the liquid medium is designated as x (° C.), it is preferable that the conditions shown below be satisfied.

$6 \leq y \leq 60$
$60 \leq x \leq 90$
$y \geq -3x+210$ (provided that x is between 60 and 65)
$y \geq -(9/5)x+132$ (provided that x is between 65 and 70)
$y \geq (9/10)x-57$ (provided that x is between 70 and 80)
$y \geq (1/2)x-25$ (provided that x is between 80 and 90)

The speed at which ethanol is added (y) is more preferably between 30 and 60 mol/Au mol/min.

When hydrazine is used as a reducing agent, the speed at which it is added to a liquid medium is preferably between 0.1 and 1 mol/Au mol/min, and temperature of the liquid medium is preferably between 2° C. and 5° C. When the speed of addition is designated as y (mol/Au mol/min) and the temperature of the liquid medium is designated as x (° C.), it is preferable that the conditions shown below be satisfied.

$0.1 \leq y \leq 1$
$2 \leq x \leq 5$
$y \leq -(1/6)x+4/3$ (provided that y is between 0.5 and 1)
$y \geq (1/20)x$ (provided that y is between 0.1 and 0.25)

The speed at which hydrazine is added (y) is more preferably between 0.25 and 0.5 mol/Au mol/min.

A gold precursor used in the present invention is not particularly limited, provided that gold can be deposited with the aid of a reducing agent. Preferable examples include chloroauric acid, sodium gold sulfite, ammonium gold sulfite, ammonium dicyanoaurate, sodium tetrachloroaurate, potassium tetrachloroaurate, sodium disulfitoaurate, and chlorotriethylphosphine gold.

The amount of a gold precursor added is not particularly limited. Preferably, a gold precursor is added to a liquid medium in an amount of 10 to 250 gold atoms relative to 100 platinum atoms.

The step of gold reduction is preferably carried out at constant temperature. To this end, a liquid medium is preferably retained at a constant level within the above temperature range of the reducing agent for at least the period of time between the addition of carrier particles that support platinum or platinum alloys, a gold precursor, and a reducing agent and the completion of the step of gold reduction.

The duration of the step of gold reduction is not particularly limited, provided that reduction and deposition of gold can be completed. In general, reduction and deposition of gold can be completed by adequately agitating the mixture of carrier particles that support platinum or platinum alloys, a gold precursor, and a reducing agent in a liquid medium for 0.5 to 5 hours.

In the step of gold reduction, the order at which the carrier particles that support platinum or platinum alloys, the gold precursor, and the reducing agent are added to a liquid medium is not particularly limited. A preferable embodiment comprises a first step of adding carrier particles that support platinum or platinum alloys and a gold precursor to a liquid medium and mixing the same and a second step of adding a reducing agent to the mixture obtained via the first step and mixing the same.

After the step of gold reduction, carrier particles that support gold-modified platinum or platinum alloys may be adequately collected via a conventional solid-liquid separation means, such as filtration or centrifugation, and then subjected to steps of washing and drying to obtain a final product.

The catalyst comprising carrier particles that support gold-modified platinum or platinum alloys obtained by the method of the present invention is useful as an electrode catalyst that catalyzes the hydrogen oxidation reaction on the hydrogen electrode and an oxygen reduction reaction on the oxygen electrode of a fuel cell (i.e., an electrode catalyst for a fuel cell).

EXAMPLES

Experiment 1

Example 101

A commercially available carbon with a high-specific surface area (Ketjen E C, Ketjen Black International, 5.0 g) was added to and dispersed in 1.2 liters of pure water. A solution of hexahydroxoplatinum nitric acid containing 5.0 g of platinum was added dropwise to the dispersion and thoroughly mixed with carbon via agitation. 0.1 N ammonia (about 100 ml) was added thereto so as to adjust the pH level to about 10, hydroxides were generated and deposited on carbon, and ethanol was further added, followed by reduction at 90° C. The dispersion was filtered, and the obtained powder was dehydrated in vacuo at 100° C. for 10 hours. The platinum supporting density of the obtained catalyst powder was determined via analysis of waste liquid, and the Pt supporting density was found to be 50 wt %. The crystallite diameter of Pt was determined to be about 2 nm via XRD analysis. The powder (1.0 g) was added to 1.2 liters of pure water and redispersed therein, an aqueous solution of chloroauric acid containing 0.25 g of chloroauric acid (0.76 mmol) was added dropwise thereto, and the mixture was thoroughly agitated. 0.1 N hydrochloric acid was added thereto so as to adjust the pH level to about 3. The dispersion was agitated at an internal temperature of 50° C. for 10 minutes. Isopropyl alcohol (hereafter abbreviated as "IPA;" 0.08 ml, 2.3 mmol) was added dropwise to the dispersion with the use of a microtube pump for 3 seconds to reduce Au. After a reducing agent (IPA) was introduced, the potential of the dispersion (i.e., the ORP value) was measured. The dispersion was agitated for 1 hour, the dispersion was filtered, and the obtained powder was dehydrated in vacuo at 100° C. for 10 hours. The obtained catalyst was subjected to ashing, the metal component was dissolved in aqua regia, and the solution was subjected to ICP analysis. As a result, the catalyst was found to contain 43% Pt and 13% Au (in terms of the number of atoms).

Example 102

When producing a catalyst in the manner described in Example 101, the temperature for Au reduction was altered to 60° C.

Example 103

When producing a catalyst in the manner described in Example 101, the temperature for Au reduction was altered to 70° C.

Example 104

When producing a catalyst in the manner described in Example 101, the temperature for Au reduction was altered to 80° C.

Example 105

When producing a catalyst in the manner described in Example 101, the temperature for Au reduction was altered to 90° C.

Example 106

When producing a catalyst in the manner described in Example 101, the reducing agent was changed with 630 mg of trisodium citrate (2.3 mol).

Example 107

When producing a catalyst in the manner described in Example 106, the temperature for Au reduction was altered to 60° C.

Example 108

When producing a catalyst in the manner described in Example 106, the temperature for Au reduction was altered to 70° C.

Example 109

When producing a catalyst in the manner described in Example 101, the reducing agent was changed with 0.08 ml of ethanol (2.3 mol), and the temperature was altered to 60° C.

Example 110

When producing a catalyst in the manner described in Example 109, the temperature for Au reduction was altered to 70° C.

Example 111

When producing a catalyst in the manner described in Example 101, the reducing agent was changed with 15 ml of an aqueous solution of 0.1 mol/l hydrazine (1.5 mmol), the temperature was altered to 2° C., and the speed at which a reducing agent is added was altered to adjust the duration of introduction to 2 minutes.

Example 112

When producing a catalyst in the manner described in Example 111, the speed at which a reducing agent is added was altered to adjust the duration of introduction to 4 minutes.

Example 113

When producing a catalyst in the manner described in Example 111, the speed at which a reducing agent is added was altered to adjust the duration of introduction to 8 minutes.

Example 114

When producing a catalyst in the manner described in Example 111, the speed at which a reducing agent is added was altered to adjust the duration of introduction to 20 minutes.

Example 115

When producing a catalyst in the manner described in Example 111, the temperature was altered to 5° C., and the speed at which a reducing agent is added was altered to adjust the duration of introduction to 8 minutes.

Comparative Example 101

When producing a catalyst in the manner described in Example 109, the temperature for Au reduction was altered to 20° C.

Comparative Example 102

When producing a catalyst in the manner described in Example 109, the temperature for Au reduction was altered to 50° C.

Comparative Example 103

When producing a catalyst in the manner described in Example 111, the speed at which a reducing agent is added was altered to adjust the duration of introduction to 0.8 minutes.

Comparative Example 104

When producing a catalyst in the manner described in Example 111, the speed at which a reducing agent is added was altered to adjust the duration of introduction to 40 minutes.

Comparative Example 105

When producing a catalyst in the manner described in Example 111, the temperature was altered to 7° C., and the speed at which a reducing agent is added was altered to adjust the duration of introduction to 8 minutes.

Comparative Example 106

When producing a catalyst in the manner described in Example 111, the temperature was altered to 10° C., and the speed at which a reducing agent is added was altered to adjust the duration of introduction to 8 minutes.

Test Method

The average particle diameter was measured using an X-ray diffractometer (Rigaku), and the average Au and Pt particle diameters were determined based on the half width at half maximum of the peak. Whether the peak would correspond to Au or Pt was determined from the peak position. Measurement was carried out 10 times and the average value was employed. A particle diameter of 5 nm or smaller indicates that the particle size fails below the lower detection limit of the X-ray diffractometer.

The coverage of Pt with Au was determined based on the amount of CO adsorption. The amount of CO adsorption was determined by measuring the amount of CO adsorbed on the Pt surface with the use of a CO adsorption pulse analyzer (BEL-METAL-3SP, BEL Japan, Inc.). When Au is present on the Pt surface, the amount of CO adsorption is reduced, since CO does not adsorb on Au. Thus, the coverage of Pt with Au can be determined using the following equation.

Coverage of Pt with Au={(amount of CO adsorbed on Pt carbon catalyst before addition of Au of Example 101)−(amount of CO adsorbed on Pt carbon catalyst covered with Au of Example or Comparative Example)}/{(amount of CO adsorbed on Pt carbon catalyst before addition of Au of Example 101)}×100

Results

The results are shown in the table below.

The ORP values (the potentials of the dispersions) in the table were determined upon completion of the introduction of the reducing agent.

TABLE 1

| | Reducing agent | Reduction temperature (° C.) | Speed at which reducing agent is introduced (reducing agent mol/Au mol/min) | Au particle diameter (nm) | Coverage of Pt surface with Au (%) | Pt:Au (atomic ratio) | ORP (mV vs Ag—AgCl) | pH of solution |
|---|---|---|---|---|---|---|---|---|
| Example 101 | IPA | 50 | 60 | 5 or smaller | 43 | 10:3 | −67 | 3 |
| Example 102 | IPA | 60 | 60 | 5 or smaller | 53 | 10:3 | −213 | 3 |
| Example 103 | IPA | 70 | 60 | 5 or smaller | 52 | 10:3 | −321 | 3 |
| Example 104 | IPA | 80 | 60 | 5 or smaller | 54 | 10:3 | −406 | 3 |
| Example 105 | IPA | 90 | 60 | 5 or smaller | 41 | 10:3 | −484 | 3 |
| Example 106 | Citric acid | 50 | 60 | 5 or smaller | 24 | 10:3 | 154 | 3 to 7 |
| Example 107 | Citric acid | 60 | 60 | 5 or smaller | 34 | 10:3 | 50 | 3 to 7 |
| Example 108 | Citric acid | 70 | 60 | 5 or smaller | 42 | 10:3 | −11 | 3 to 7 |
| Comparative Example 101 | EtOH | 20 | 60 | 35 | 2 | 10:3 | 450 | 3 |
| Comparative Example 102 | EtOH | 50 | 60 | 21 | 3 | 10:3 | 252 | 3 |
| Example 109 | EtOH | 60 | 60 | 5 or smaller | 12 | 10:3 | 230 | 3 |
| Example 110 | EtOH | 70 | 60 | 5 or smaller | 50 | 10:3 | −124 | 3 |
| Comparative Example 103 | Hydrazine | 2 | 2.5 | 10 | 5 | 10:3 | −950 | 3 to 8 |
| Example 111 | Hydrazine | 2 | 1 | 5 or smaller | 28 | 10:3 | −630 | 3 to 8 |
| Example 112 | Hydrazine | 2 | 0.5 | 5 or smaller | 47 | 10:3 | −472 | 3 to 8 |
| Example 113 | Hydrazine | 2 | 0.25 | 5 or smaller | 50 | 10:3 | −166 | 3 to 8 |
| Example 114 | Hydrazine | 2 | 0.1 | 5 or smaller | 20 | 10:3 | 210 | 3 to 8 |
| Comparative Example 104 | Hydrazine | 2 | 0.05 | 6 | 9 | 10:3 | 250 | 3 to 8 |
| Example 115 | Hydrazine | 5 | 0.25 | 5 or smaller | 40 | 10:3 | −510 | 3 to 8 |
| Comparative Example 105 | Hydrazine | 7 | 0.25 | 7 | 9 | 10:3 | −694 | 3 to 8 |
| Comparative Example 106 | Hydrazine | 10 | 0.25 | 15 | 5 | 10:3 | −830 | 3 to 8 |

FIG. 1 shows the correlation between the ORP value and the coverage of a Pt surface with Au.

The coverage of a Pt surface with Au was confirmed to be large when the ORP value was between −630 mV and +230 mV (with reference to the Ag—AgCl electrode), Experiment 2

Example 201

A commercially available carbon with a high-specific surface area (Ketjen E C, Ketjen Black International, 5.0 g) was added to and dispersed in 1.2 liters of pure water. A solution of hexahydroxoplatinum nitric acid containing 5.0 g of platinum was added dropwise to the dispersion and thoroughly mixed with carbon via agitation. 0.1 N ammonia (about 100 ml) was added thereto so as to adjust the pH level to about 10, hydroxides were generated and deposited on carbon, and ethanol was further added, followed by reduction at 90° C. The dispersion was filtered, and the obtained powder was dehydrated in vacuo at 100° C. for 10 hours. The platinum supporting density of the obtained catalyst powder was determined via analysis of waste liquid, and the Pt supporting density was found to be 50 wt %. The crystallite diameter of Pt was determined to be about 2 nm via XRD analysis. The powder (1.0 g) was added to 1.2 liters of pure water and redispersed therein, an aqueous solution of chloroauric acid containing 0.25 g of chloroauric acid (0.76 mmol) was added dropwise thereto, and the mixture was thoroughly agitated. 0.1 N hydrochloric acid was added thereto so as to adjust the pH level to about 3. The dispersion was cooled in a bath containing a coolant and agitated at an internal temperature of 2° C. for 10 minutes. An aqueous solution of 0.1 mol/l hydrazine (15 ml, 1.5 mmol) was added dropwise to the dispersion with the use of a microtube pump for 2 minutes to reduce Au. After a reducing agent (hydrazine) was introduced, the potential of the dispersion (i.e., the ORP value) was measured. The dispersion was agitated for 1 hour, the dispersion was filtered, and the obtained powder was dehydrated in vacuo at 100° C. for 10 hours. The obtained catalyst was subjected to ICP analysis. As a result, the catalyst was found to contain 43% Pt and 13% Au (in terms of the number of atoms), Example 202

When producing a catalyst in the manner described in Example 201, the speed at which a reducing agent is added was altered to adjust the duration of introduction to 4 minutes.

Example 203

When producing a catalyst in the manner described in Example 201, the speed at which a reducing agent is added was altered to adjust the duration of introduction to 8 minutes.

Example 204

When producing a catalyst in the manner described in Example 201, the speed at which a reducing agent is added was altered to adjust the duration of introduction to 20 minutes.

Example 205

When producing a catalyst in the manner described in Example 201, the temperature for Au reduction was altered to 5° C., and the speed at which a reducing agent is added was altered to adjust the duration of introduction to 4 minutes.

Example 206

When producing a catalyst in the manner described in Example 201, the temperature for Au reduction was altered to 5° C., and the speed at which a reducing agent is added was altered to adjust the duration of introduction to 8 minutes.

Comparative Example 201

When producing a catalyst in the manner described in Example 201, the temperature for Au reduction was altered to 2° C., and the speed at which a reducing agent is added was altered to adjust the duration of introduction to 0.8 minutes.

Comparative Example 202

When producing a catalyst in the manner described in Example 201, the temperature for Au reduction was altered to 2° C., and the speed at which a reducing agent is added was altered to adjust the duration of introduction to 40 minutes.

Comparative Example 203

When producing a catalyst in the manner described in Example 201, the temperature for Au reduction was altered to 5° C., and the speed at which a reducing agent is added was altered to adjust the duration of introduction to 2 minutes.

Comparative Example 204

When producing a catalyst in the manner described in Example 201, the temperature for Au reduction was altered to 7° C., and the speed at which a reducing agent is added was altered to adjust the duration of introduction to 8 minutes.

Comparative Example 205

When producing a catalyst in the manner described in Example 201, the temperature for Au reduction was altered to 10° C., and the speed at which a reducing agent is added was altered to adjust the duration of introduction to 8 minutes.

Test Method

The average particle diameter and the amount of CO adsorption were measured in the same manner as in Experiment 1. The coverage of Pt with Au was determined using the following equation.

Coverage of Pt with Au={(amount of CO adsorbed on Pt carbon catalyst before addition of Au of Example 201)−(amount of CO adsorbed on Pt carbon catalyst covered with Au of Example or Comparative Example)}/{(amount of CO adsorbed on Pt carbon catalyst before addition of Au of Example 201)}×100

Results

The results are shown in the table below.

The ORP values (the potentials of the dispersions) in the table were measured upon completion of the introduction of the reducing agent.

TABLE 2

| | Reduction temperature (° C.) | Speed at which reducing agent is introduced (reducing agent mol/Au mol/min) | Au particle diameter (nm) | Coverage of Pt surface with Au (%) | ORP (mV vs Ag—AgCl) | pH of solution |
|---|---|---|---|---|---|---|
| Comparative Example 201 | 2 | 2.5 | 10 | 5 | −950 | 3 to 8 |
| Example 201 | 2 | 1 | 5 or smaller | 28 | −630 | 3 to 8 |
| Example 202 | 2 | 0.5 | 5 or smaller | 47 | −472 | 3 to 8 |
| Example 203 | 2 | 0.25 | 5 or smaller | 50 | −166 | 3 to 8 |
| Example 204 | 2 | 0.1 | 5 or smaller | 20 | 210 | 3 to 8 |
| Comparative Example 202 | 2 | 0.05 | 6 | 9 | 250 | 3 to 8 |
| Comparative Example 203 | 5 | 1 | 6 | 9 | −720 | 3 to 8 |
| Example 205 | 5 | 0.5 | 5 or smaller | 35 | −610 | 3 to 8 |

TABLE 2-continued

|  | Reduction temperature (° C.) | Speed at which reducing agent is introduced (reducing agent mol/Au mol/min) | Au particle diameter (nm) | Coverage of Pt surface with Au (%) | ORP (mV vs Ag—AgCl) | pH of solution |
|---|---|---|---|---|---|---|
| Example 206 | 5 | 0.25 | 5 or smaller | 40 | −550 | 3 to 8 |
| Comparative Example 204 | 7 | 0.25 | 7 | 9 | −694 | 3 to 8 |
| Comparative Example 205 | 10 | 0.25 | 15 | 5 | −830 | 3 to 8 |

As with the case of Experiment 1, the coverage of a Pt surface with Au was confirmed to be large when the ORP value was between −630 my and +230 mV (with reference to the Ag—AgCl electrode).

Figure 2:
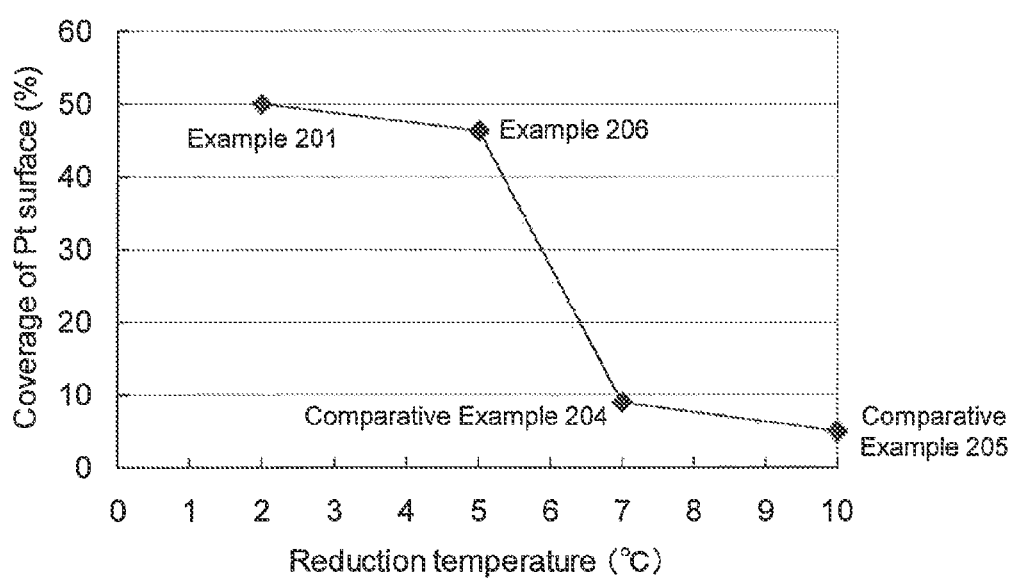
FIG. 2 shows the correlation between a reduction temperature and the coverage of a Pt surface with Au, when hydrazine is used as a reducing agent.

FIG. 2 shows the correlation between a reduction temperature and the coverage of a Pt surface with Au.

Figure 3:
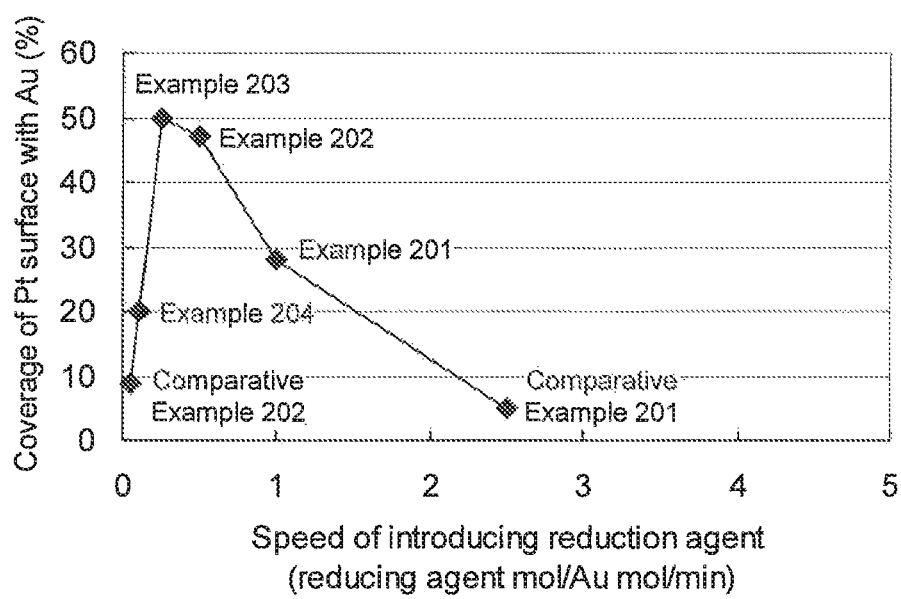
FIG. 3 shows the correlation between the speed at which a reducing agent is introduced and the coverage of a Pt surface with Au, when hydrazine is used as a reducing agent.

FIG. 3 shows the correlation between the speed at which a reducing agent is introduced and the coverage of a Pt surface with Au.

Figure 4:
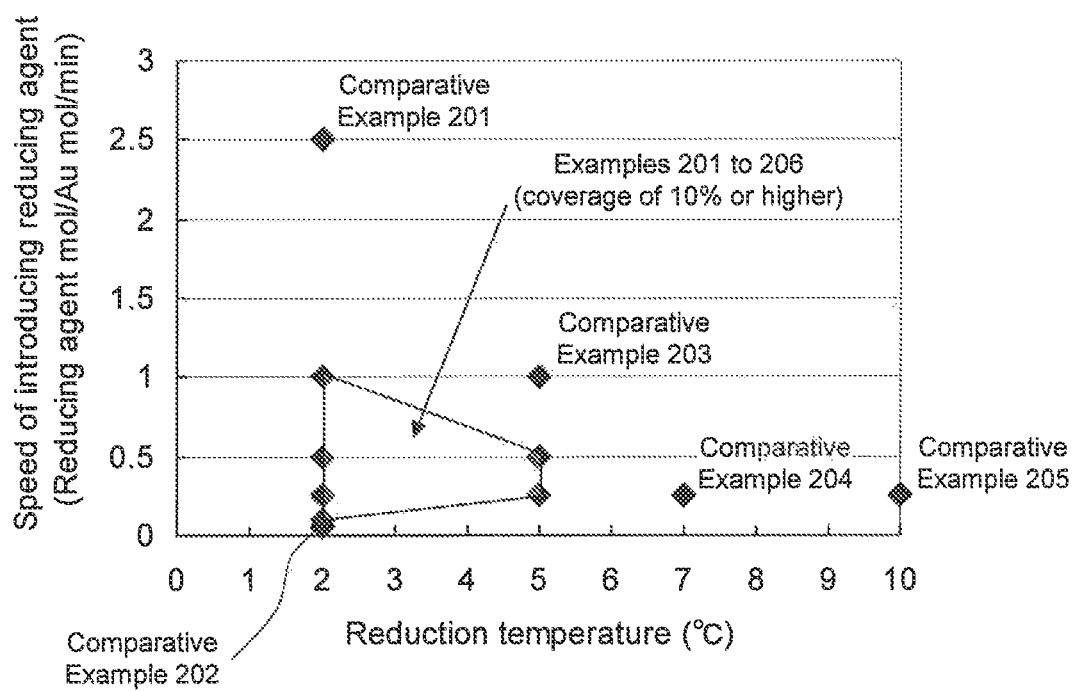
FIG. 4 shows the correlation among a reduction temperature, the speed at which a reducing agent is introduced, and the coverage of a Pt surface with Au, when hydrazine is used as a reducing agent.

FIG. 4 shows the correlation among a reduction temperature, the speed at which a reducing agent is introduced, and the coverage of a Pt surface with Au.

When hydrazine is used as a reducing agent, the coverage of a Pt surface with Au can be increased by setting the reduction temperature between 2° C. and 5° C., and by setting the speed at which a reducing agent is added between 0.1 and 1 mol/Au salt mol/min.

Experiment 3

Example 301

A commercially available carbon with a high-specific surface area (Ketjen E C, Ketjen Black International, 5.0 g) was added to and dispersed in 1.2 liters of pure water. A solution of hexahydroxoplatinum nitric acid containing 5.0 g of platinum was added dropwise to the dispersion and thoroughly mixed with carbon via agitation. 0.1 N ammonia (about 100 ml) was added thereto so as to adjust the pH level to about 10, hydroxides were generated and deposited on carbon, and ethanol was further added, followed by reduction at 90° C. The dispersion was filtered, and the obtained powder was dehydrated in vacuo at 100° C. for 10 hours. The platinum supporting density of the obtained catalyst powder was determined via analysis of waste liquid, and the Pt supporting density was found to be 50 wt %. The crystallite diameter of Pt was determined to be about 2 nm via XRD analysis. The powder (1.0 g) was added to 1.2 liters of pure water and redispersed therein, an aqueous solution of chloroauric acid containing 0.25 g of chloroauric acid (0.76 mmol) was added dropwise thereto, and the mixture was thoroughly agitated. 0.1 N hydrochloric acid was added thereto so as to adjust the pH level to about 3. The dispersion was heated to 60° C. and then agitated for 10 minutes. An aqueous solution (10 g) containing 0.08 ml (2.3 mmol) of ethanol (a reducing agent) was added dropwise to the dispersion with the use of a microtube pump for 3 seconds to reduce Au. After a reducing agent (hydrazine) was introduced, the potential of the dispersion (i.e., the ORP value) was measured. The dispersion was agitated for 1 hour, the dispersion was filtered, and the obtained powder was dehydrated in vacuo at 100° C. for 10 hours. The obtained catalyst was subjected to ICP analysis. As a result, the catalyst was found to contain 43% Pt and 13% Au (in terms of the number of atoms).

Example 302

When producing a catalyst in the manner described in Example 301, the temperature for Au reduction was altered to 65° C.

Example 303

When producing a catalyst in the manner described in Example 301, the temperature for Au reduction was altered to 70° C.

Example 304

When producing a catalyst in the manner described in Example 301, the temperature for Au reduction was altered to 80° C.

Example 305

When producing a catalyst in the manner described in Example 301, the temperature for Au reduction was altered to 90° C.

Example 306

When producing a catalyst in the manner described in Example 301, the speed at which a reducing agent is added was altered to adjust the duration of introduction to 6 seconds.

Example 307

When producing a catalyst in the manner described in Example 301, the temperature for Au reduction was altered to 65° C., and the speed at which a reducing agent is added was altered to adjust the duration of introduction to 12 seconds.

Example 308

When producing a catalyst in the manner described in Example 301, the temperature for Au reduction was altered to 70° C., and the speed at which a reducing agent is added was altered to adjust the duration of introduction to 6 seconds.

Example 309

When producing a catalyst in the manner described in Example 301, the temperature for Au reduction was altered to 70° C., and the speed at which a reducing agent is added was altered to adjust the duration of introduction to 18 seconds.

Example 310

When producing a catalyst in the manner described in Example 301, the temperature for Au reduction was altered to 70° C., and the speed at which a reducing agent is added was altered to adjust the duration of introduction to 30 seconds.

Example 311

When producing a catalyst in the manner described in Example 301, the temperature for Au reduction was altered to 80° C., and the speed at which a reducing agent is added was altered to adjust the duration of introduction to 12 seconds.

Example 312

When producing a catalyst in the manner described in Example 301, the temperature for Au reduction was altered to 90° C., and the speed at which a reducing agent is added was altered to adjust the duration of introduction to 9 seconds.

Comparative Example 301

When producing a catalyst in the manner described in Example 301, the temperature for Au reduction was altered to 50° C.

Comparative Example 302

When producing a catalyst in the manner described in Example 301, the temperature for Au reduction was altered to 95° C.

Comparative Example 303

When producing a catalyst in the manner described in Example 301, the speed at which a reducing agent is added was altered to adjust the duration of introduction to 9 seconds.

Comparative Example 304

When producing a catalyst in the manner described in Example 301, the temperature for Au reduction was altered to 65° C., and the speed at which a reducing agent is added was altered to adjust the duration of introduction to 36 seconds.

Comparative Example 305

When producing a catalyst in the manner described in Example 301, the temperature for Au redaction was altered to 70° C., and the speed at which a reducing agent is added was altered to adjust the duration of introduction to 60 seconds.

Comparative Example 306

When producing a catalyst in the manner described in Example 301, the temperature for Au reduction was altered to 80° C., and the speed at which a reducing agent is added was altered to adjust the duration of introduction to 36 seconds.

Comparative Example 307

When producing a catalyst in the manner described in Example 301, the temperature for Au reduction was altered to 90° C., and the speed at which a reducing agent is added was altered to adjust the duration of introduction to 18 seconds.

Test Method

The average particle diameter and the amount of CO adsorption were measured in the same manner as in Experiment 1. The coverage of Pt with Au was determined using the following equation.

$$\text{Coverage of Pt with A} = \frac{\{(\text{amount of CO adsorbed on Pt carbon catalyst before addition of Au of Example 301}) - (\text{amount of CO adsorbed on Pt carbon catalyst covered with Au of Example or Comparative Example})\}}{\{(\text{amount of CO adsorbed on Pt carbon catalyst before addition of Au of Example 301})\}} \times 100$$

Results

The results are shown in the table below.

The ORP values (the potentials of the dispersions) in the table were measured upon completion of the introduction of the reducing agent.

TABLE 3

| | Reduction temperature (° C.) | Speed at which reducing agent is introduced (reducing agent mol/Au mol/min) | Au particle diameter (nm) | Coverage of Pt surface with Au (%) | Pt:Au (atomic ratio) | ORP (mV vs Ag—AgCl) | pH of solution |
|---|---|---|---|---|---|---|---|
| Comparative Example 301 | 50 | 60 | 21 | 3 | 10:3 | 252 | 3 |
| Example 301 | 60 | 60 | 5 or smaller | 12 | 10:3 | 230 | 3 |
| Example 302 | 65 | 60 | 5 or smaller | 25 | 10:3 | 53 | 3 |
| Example 303 | 70 | 60 | 5 or smaller | 50 | 10:3 | −124 | 3 |
| Example 304 | 80 | 60 | 5 or smaller | 45 | 10:3 | −320 | 3 |
| Example 305 | 90 | 60 | 5 or smaller | 30 | 10:3 | −530 | 3 |
| Comparative Example 302 | 95 | 60 | 12 | 5 | 10:3 | −750 | 3 |
| Comparative Example 303 | 60 | 20 | 11 | 5 | 10:3 | 300 | 3 |
| Example 306 | 60 | 30 | 5 or smaller | 11 | 10:3 | 220 | 3 |
| Comparative Example 304 | 65 | 5 | 15 | 5 | 10:3 | Data not available | 3 |
| Example 307 | 65 | 15 | 5 or smaller | 10 | 10:3 | Data not available | 3 |
| Example 308 | 70 | 30 | 5 or smaller | 44.6 | 10:3 | Data not available | 3 |
| Example 309 | 70 | 10 | 5 or smaller | 35.2 | 10:3 | Data not available | 3 |
| Example 310 | 70 | 6 | 5 or smaller | 11 | 10:3 | Data not available | 3 |
| Comparative Example 305 | 70 | 3 | 24 | 3 | 10:3 | Data not available | 3 |
| Comparative Example 306 | 80 | 5 | 10 | 5 | 10:3 | Data not available | 3 |
| Example 311 | 80 | 15 | 5 or smaller | 10 | 10:3 | Data not available | 3 |

TABLE 3-continued

|  | Reduction temperature (° C.) | Speed at which reducing agent is introduced (reducing agent mol/Au mol/min) | Au particle diameter (nm) | Coverage of Pt surface with Au (%) | Pt:Au (atomic ratio) | ORP (mV vs Ag—AgCl) | pH of solution |
|---|---|---|---|---|---|---|---|
| Comparative Example 307 | 90 | 10 | 5 or smaller | 8 | 10:3 | Data not available | 3 |
| Example 312 | 90 | 20 | 5 or smaller | 20 | 10:3 | Data not available | 3 |

As with the case of Experiment 1, the coverage of a Pt surface with Au was confirmed to be high when the ORP value was between −630 mV and +230 mV (with reference to the Ag—AgCl electrode).

Figure 5:
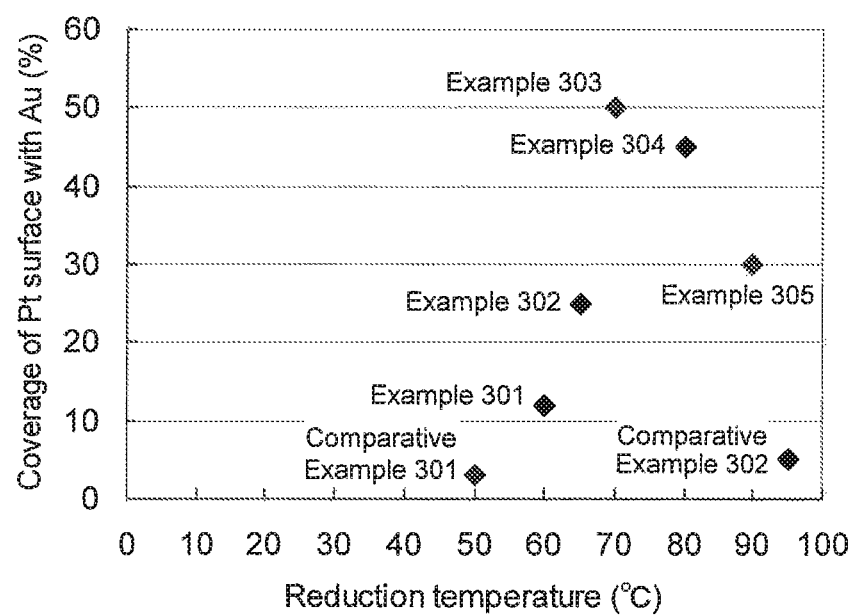
FIG. 5 shows the correlation between a reduction temperature and the coverage of a Pt surface with Au, when ethanol is used as a reducing agent.

FIG. 5 shows the correlation between a reduction temperature and the coverage of a Pt surface with Au.

Figure 6:
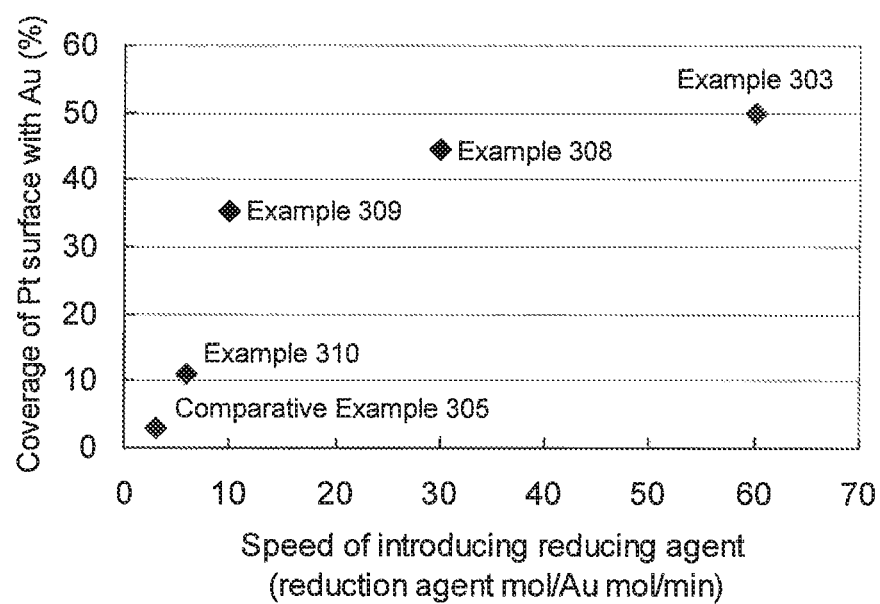
FIG. 6 shows the correlation between the speed at which a reducing agent is introduced and the coverage of a Pt surface with Au, when ethanol is used as a reducing agent.

FIG. 6 shows the correlation between the speed at which a reducing agent is introduced and the coverage of a Pt surface with Au.

Figure 7:
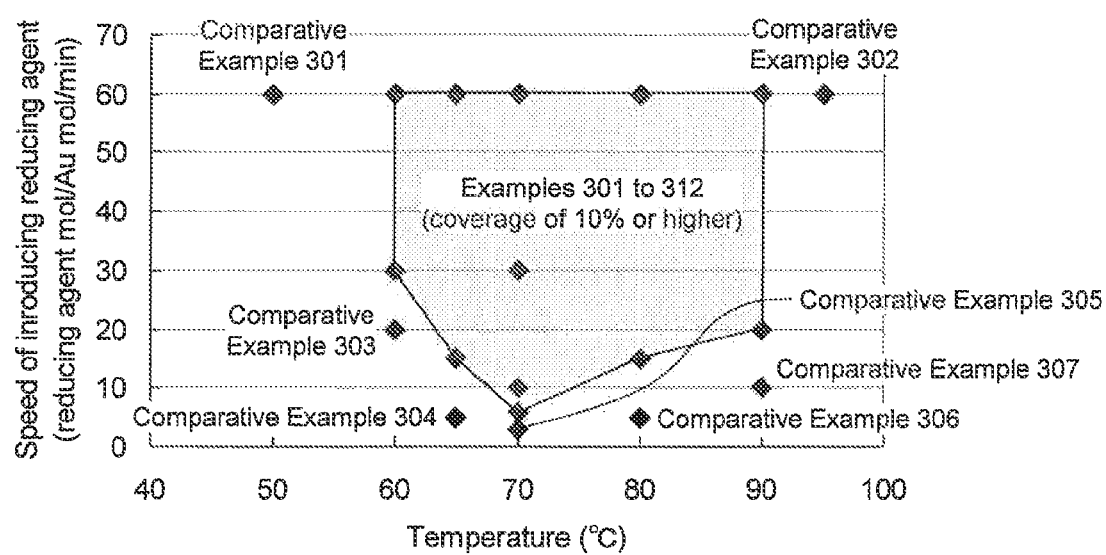
FIG. 7 shows the correlation among a reduction temperature, the speed at which a reducing agent is introduced, and the coverage of a Pt surface with Au, when ethanol is used as a reducing agent.

FIG. 7 shows the correlation among a reduction temperature, the speed at which a reducing agent is introduced, and the coverage of a Pt surface with Au.

When ethanol is used as a reducing agent, the coverage of a Pt surface with Au can be increased by setting the reduction temperature between 60° C. and 90° C., and by setting the speed at which a reducing agent is added between 6 and 60 mol/Au salt mol/min.

The invention claimed is:

1. A method for producing a catalyst comprising carrier particles that support gold-modified platinum or platinum alloys comprising a step of gold reduction comprising adding carrier particles that support platinum or platinum alloys, a reducing agent, and a gold precursor to a liquid medium and mixing the same, wherein the step of gold reduction comprises adding the reducing agent to adjust the ORP value an oxidation-reduction potential with reference to a silver-silver chloride electrode) of the liquid medium to −630 to +230 mV upon completion of addition.

2. The method according to claim 1, wherein the step of gold reduction comprises a first step of adding the carrier particles that support platinum or platinum alloys and the gold precursor to the liquid medium and mixing the same and a second step of adding the reducing agent to the mixture obtained in the first step.

3. The method according to claim 1, wherein the reducing agent is a branched-chain alcohol.

4. The method according to claim 3, wherein the branched-chain alcohol is isopropyl alcohol.

5. The method according to claim 1, wherein the reducing agent is ethanol and, in the step of gold reduction, the speed at which ethanol is added to the liquid medium is 6 to 60 mol/Au mol/min, and the temperature of the liquid medium is between 60° C. and 90° C.

6. The method according to claim 1, wherein the reducing agent is hydrazine and, in the step of gold reduction, the speed at which hydrazine is added to the liquid medium is 0.1 to 1 mol/Au mol/min, and the temperature of the liquid medium is between 2° C. to 5° C.

7. The method according to claim 1, wherein the catalyst is an electrode catalyst for a fuel cell.

\* \* \* \* \*